United States Patent
Kim et al.

(10) Patent No.: US 9,510,225 B2
(45) Date of Patent: Nov. 29, 2016

(54) INTERFERENCE MEASUREMENT METHOD AND APPARATUS FOR USE IN DISTRIBUTED ANTENNA SYSTEM

(71) Applicant: Samsung Electronics Co., Ltd., Gyeonggi-do (KR)

(72) Inventors: Younsun Kim, Gyeonggi-do (KR); Hyojin Lee, Gyeonggi-do (KR); Youngbum Kim, Seoul (KR); Joonyoung Cho, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 140 days.

(21) Appl. No.: 14/036,644

(22) Filed: Sep. 25, 2013

(65) Prior Publication Data
US 2014/0086082 A1    Mar. 27, 2014

(30) Foreign Application Priority Data
Sep. 25, 2012 (KR) .......................... 10-2012-0106745

(51) Int. Cl.
*H04W 24/10*   (2009.01)
*H04B 17/345*   (2015.01)
(Continued)

(52) U.S. Cl.
CPC ........... *H04W 24/10* (2013.01); *H04B 17/345* (2015.01); *H04B 7/024* (2013.01); *H04L 5/0048* (2013.01); *H04L 5/0062* (2013.01); *H04L 5/0073* (2013.01); *H04W 72/1226* (2013.01)

(58) Field of Classification Search
CPC ........................... H04W 24/10; H04W 72/082
USPC ................................................ 370/252, 229
See application file for complete search history.

(56) References Cited

U.S. PATENT DOCUMENTS

2011/0317657 A1* 12/2011 Chmiel et al. ................ 370/331
2012/0127878 A1   5/2012 Kim et al.
(Continued)

FOREIGN PATENT DOCUMENTS

KR   1020120055747   6/2012
KR   1020120092523   8/2012
(Continued)

OTHER PUBLICATIONS

Samsung, "Interference Measurement Resource for Downlink CoMP", R1-122236, 3GPP TSG RAN WG1 #69, May 21-25, 2012.
(Continued)

*Primary Examiner* — Rasheed Gidado
(74) *Attorney, Agent, or Firm* — The Farrell Law Firm, P.C.

(57) ABSTRACT

An interference measurement method and apparatus for use in a Distributed Antenna System (DAS) is provided. The method for transmitting channel state information based on interference measurement of a terminal in a Distributed Antenna System (DAS) according to the present disclosure includes receiving configuration of Interference Measurement Resource (IMR) for measuring interferences caused by plural Transmission Points (TPs), receiving control information including scheduling information on Physical Downlink Shared Channel (PDSCH), determining whether IMR-based interference measurement and PDSCH reception occur at a same subframe, and transmitting the channel state information generated according to a result of the determination. The interference measurement method and apparatus of the present disclosure is capable of measuring interference for efficient communication in the distributed antenna system.

10 Claims, 15 Drawing Sheets

(51) Int. Cl.
*H04W 72/12* (2009.01)
*H04L 5/00* (2006.01)
*H04B 7/02* (2006.01)

(56) References Cited

U.S. PATENT DOCUMENTS

| | | |
|---|---|---|
| 2012/0155291 A1 | 6/2012 | Koivisto et al. |
| 2012/0264441 A1* | 10/2012 | Chandrasekhar ..... H04L 5/0073 455/450 |
| 2013/0156008 A1* | 6/2013 | Dinan .................. H04B 7/0456 370/332 |
| 2013/0188624 A1* | 7/2013 | Lee ....................... H04W 24/02 370/338 |
| 2013/0194931 A1* | 8/2013 | Lee ....................... H04L 5/0053 370/241 |
| 2013/0258965 A1* | 10/2013 | Geirhofer et al. ............ 370/329 |
| 2013/0279350 A1* | 10/2013 | Erickson ............... H04W 24/08 370/252 |
| 2013/0286867 A1* | 10/2013 | Davydov et al. ............. 370/252 |
| 2013/0294273 A1* | 11/2013 | Lunttila et al. ............... 370/252 |
| 2013/0301450 A1* | 11/2013 | Geirhofer .............. H04B 7/024 370/252 |
| 2013/0315195 A1 | 11/2013 | Ko et al. |
| 2014/0036706 A1* | 2/2014 | Mondal et al. ............... 370/252 |

FOREIGN PATENT DOCUMENTS

| | | |
|---|---|---|
| WO | WO 2012/109037 | 8/2012 |
| WO | WO 2012/121774 | 9/2012 |

OTHER PUBLICATIONS

CATT, "Remaining Issues on Interference Measurement", R1-123213, 3GPP TSG RAN WG1 Meeting #70, Aug. 13-17, 2012, 4 pages.
Intel Corporation, "Remaining Issues of Interference Measurements", R1-122881, 3GPP TSG-RAN WG1 #69, May 21-25, 2012, 5 pages.
ZTE, "Evaluation and Discussion on Interference Measurement", R1-121043, 3GPP TSG RAN WG1 Meeting #68bis, Mar. 26-30, 2012, 12 pages.
Huawei et al., "Interference Measurement Resource Configuration and CQI Calculation", R1-121947, 3GPP TSG RAN WG1 Meeting #69, May 21-25, 2012, 7 pages.
InterDigital Communications, LLC, "Interference Measurements for CoMP", R1-122549, 3GPP TSG-RAN WG1 Meeting #69, May 21-25, 2012, 6 pages.
European Search Report dated Jun. 6, 2016 issued in counterpart application No. 13842013.8-1855, 16 pages.
Partial European Search Report dated Mar. 21, 2016 issued in counterpart application No. 13842013.8-1855, 7 pages.

* cited by examiner

INTERFERENCE MEASUREMENT METHOD AND APPARATUS FOR USE IN DISTRIBUTED ANTENNA SYSTEM

PRIORITY

This application claims priority under 35 U.S.C. §119(a) to Korean Application Serial No. 10-2012-0106745, which was filed in the Korean Intellectual Property Office on Sep. 25, 2012 the entire content of which is incorporated herein by reference.

BACKGROUND OF THE INVENTION

1. Field of the Invention

The present disclosure relates to an interference measurement method and apparatus for use in a Distributed Antenna System (DAS).

2. Description of the Related Art

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in 3rd Generation Partnership Project (3GPP), High Rate Packet Data (HRPD) defined in 3rd Generation Partnership Project-2 (3GPP2), and 802.16 defined in IEEE, have been developed to support the high-speed, high-quality wireless packet data communication services. Particularly, LTE a communication standard developed to support high speed packet data transmission and to maximize the throughput of the radio communication system with various radio access technologies. LTE-A is the evolved version of LTE to improve the data transmission capability.

LTE is characterized by 3GPP Release 8 or 9 capable base station and terminal (user equipment) while LTE-A is characterized by 3GPP Release 10 capable base station and user equipment. As a key standardization organization, 3GPP continues standardization of the next release for more improved performance beyond LTE-A.

The existing 3rd and 4th generation wireless packet data communication systems (such as HSDPA, HSUPA, HRPD, and LTE/LTE-A) adopt Adaptive Modulation and Coding (AMC) and Channel-Sensitive Scheduling techniques to improve the transmission efficiency. AMC allows the transmitter to adjust the data amount to be transmitted according to the channel condition. That is, the transmitter is capable of decreasing the data transmission amount for bad channel condition so as to fix the received signal error probability at a certain level or increasing the data transmission amount for good channel condition so as to transmit large amount of information efficiently while maintaining the received signal error probability at an intended level. Meanwhile, the channel sensitive scheduling allows the transmitter to serve the user having good channel condition selectively among a plurality of users so as to increase the system capacity as compared to allocating a channel fixedly to serve a single user. This increase in system capacity is referred to as multi-user diversity gain. In brief, the AMC method and the channel-sensitive scheduling method are methods for receiving partial channel state information being fed back from a receiver, and applying an appropriate modulation and coding technique at the most efficient time determined depending on the received partial channel state information.

In case of using AMC along with Multiple Input Multiple Output (MIMO) transmission scheme, it may be necessary to take a number of spatial layers and ranks for transmitting signals in to consideration. In this case, the transmitter determines the optimal data rate in consideration of the number of layers for use in MIMO transmission.

Recently, many researches are being conducted to replace Code Division Multiple Access (CDMA) used in the legacy 2nd and 3rd mobile communication systems with Orthogonal Frequency Division Multiple Access (OFDMA) for the next generation mobile communication system. The 3GPP and 3GPP2 are in the middle of the standardization of OFDMA-based evolved system. OFDMA is expected to provide superior system throughput as compared to the CDMA. One of the main factors that allow OFDMA to increase system throughput is the frequency domain scheduling capability. As channel sensitive scheduling increases the system capacity using the time-varying channel characteristic, OFDM can be used to obtain more capacity gain using the frequency-varying channel characteristic.

FIG. 1 is a graph illustrating a relationship between time and frequency resources in LTE/LTE-A system.

As shown in FIG. 1, the radio resource for transmission from the evolved Node B (eNB) to a User Equipment (UE) is divided into Resource Blocks (RBs) in the frequency domain and subframes in the time domain. In the LTE/LTE-A system, an RB consists of 12 consecutive carriers and occupies 180 kHz bandwidth in general.

Meanwhile, a subframe consists of 14 OFDM symbols and spans 1 msec. The LTE/LTE-A system allocates resources for scheduling in unit subframe in the time domain and in unit of RB in the frequency domain.

FIG. 2 is a time-frequency grid illustrating a single resource block of a downlink subframe as a smallest scheduling unit in the LTE/LTE-A system.

As shown in FIG. 2, the radio resource is of one subframe in the time domain and one RB in the frequency domain. The radio resource consists of 12 subcarriers in the frequency domain and 14 OFDM symbols in the time domain, i.e. 168 unique frequency-time positions. In LTE/LTE-A, each frequency-time position is referred to as Resource Element (RE).

The radio resource structured as shown in FIG. 2 can be used for transmitting plural different types of signals as follows.

- CRS (Cell-specific Reference Signal): reference signal transmitted to all the UEs within a cell
- DMRS (Demodulation Reference Signal): reference signal transmitted to a specific UE
- PDSCH (Physical Downlink Shared Channel): data channel transmitted in downlink which the eNB use to transmit data to the UE and mapped to REs not used for reference signal transmission in data region of FIG. 2
- CSI-RS (Channel Status Information Reference Signal): reference signal transmitted to the UEs within a cell and used for channel state measurement. Multiple CSI-RSs can be transmitted within a cell.
- Other control channels (PHICH, PCFICH, PDCCH): channels for providing control channel necessary for the UE to receive PDCCH and transmitting ACK/NACK of HARQ operation for uplink data transmission In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS, and the UE receives the traffic signal skipping the corresponding radio resource in general. In the LTE-A system, the zero power CSI-RS is referred to as muting. The zero power CSI-RS (muting) by nature is mapped to the CSI-RS position without transmission power allocation.

In FIG. 2, the CSI-RS can be transmitted at some of the positions marked by A, B, C, D, E, F, G, H, I, and J according to the number of number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, entire of the specific pattern is used for CSI-RS transmission; and for eight antenna ports, two patterns are used for CSI-RS transmission. Meanwhile, muting is always performed by pattern. That is, although the muting may be applied to plural patterns, if the muting positions mismatch CSI-RS positions, it cannot be applied to one pattern partially.

In a cellular system, the reference signal has to be transmitted for downlink channel state measurement. In the case of the 3GPP LTE-A system, the UE measures the channel state with the eNB using the CSI-RS transmitted by the eNB. The channel state is measured in consideration of a few factors including downlink interference. The downlink interference includes the interference caused by the antennas of neighbor eNBs and thermal noise that are important in determining the downlink channel condition. For example, in the case that the eNB with one transmit antenna transmits the reference signal to the UE with one receive antenna, the UE has to determine energy per symbol that can be received in downlink and interference amount that may be received for the duration of receiving the corresponding symbol to calculate Es/Io from the received reference signal. The calculated Es/Io is reported to the eNB such that the eNB determines the downlink data rate for the UE.

In the typical mobile communication system, the base station apparatus is positioned at the center of each cell and communicates with the UE using one or plural antennas deployed at a restricted position. Such a mobile communication system implemented with the antennas deployed at the same position within the cell is referred to as Centralized Antenna System (CAS). In contrast, the mobile communication system implemented with plural Remote Radio Heads (RRHs) belonging to a cell are distributed within the cell area is referred to as Distributed Antenna System (DAS).

FIG. 3 is a diagram illustrating an exemplary antenna arrangement in the conventional distributed antenna system.

In FIG. 3, there are distributed antenna system-based cells 300 and 310. The cell 300 includes five antennas including one high power transmission antenna 320 and four low power antennas 341, 342, 344, and 343. The high power transmission antenna 320 is capable of providing at least minimum service within the coverage area of the cell while the low power antennas 341, 342, 343, and 344 are capable of providing UEs with the high data rate service within a restricted area. The low and high power transmission antennas are all connected to the central controller and operate in accordance with the scheduling and radio resource allocation of the central controller. In the distributed antenna system, one or more antennas may be deployed at one geometrically separated antenna position. In the distributed antenna system, the antenna(s) deployed at the same position is referred to as Remote Radio Head (RRH).

In the distributed antenna system depicted in FIG. 3, the UE receives signals from one geometrically distributed antenna group and regards the signals from other antenna groups as interference.

FIG. 4 is a diagram illustrating an exemplary situation of interference between antenna groups transmitting different UEs in the conventional distributed antenna system.

In FIG. 4, the UE1 400 is receiving traffic signal from the antenna group 410. Meanwhile, the UE2 420, UE3 440, and UE4 460 are receiving traffic signals from antenna groups 430, 450, and 460, respectively. The UE1 400 which is receiving the traffic signal from the antenna group 410 is influenced by the interference of the other antenna groups transmitting traffic signals to other UEs. That is, the signals transmitted the antenna groups 430, 450, and 470 cause interferences to UE1 400.

Typically, in the distributed antenna system, the interferences caused by other antenna groups are classified into two categories:

Inter-cell interference: interference caused by antenna groups of other cells

Intra-cell interference: interference caused by antenna groups of same cell

In FIG. 4, the UE 1 undergoes intra-cell interference from the antenna group 430 of the same cell and inter-cell interference from the antenna groups 450 and 47 of a neighbor cell. The inter-cell interference and the intra-call interference are influence the data channel reception of the UE simultaneously.

In order for the DAS-capable UE to receive downlink signal at optimal data rate, it is necessary to measure the inter-cell interference and intra-cell interference accurately and compare these with the received signal strength to request the eNB for the data rate based on the comparison result.

Unlike DAS, Centralized Antenna System (CAS) has only one antenna group. In this case, there is on intra-cell interference caused by other antenna groups within the same cell but inter-cell interference caused by the antenna groups of neighbor cells. In the case that the LTE/LTE-A system is implemented based on CAS, it is possible to measure the inter-cell interference using the CRS described with reference to FIG. 2. Typically, in the DAS-based system, the UE performs Inverse Fast Fourier Transform (IFFT) on the CRS having periodic characteristic in frequency domain to generate delay domain signal.

FIG. 5 is a graph illustrating delay domain signals converted from CRS.

In the LTE/LTE-A system, if the signal is converted to delay domain single through IFFT, it is possible to acquire the channel impulse response having the tendency in which the energy carried by the delay component decreases as the delay increases as shown in FIG. 5. Typically, the tail part of the signal acquired through IFFT corresponds to the interference caused by other cell while head part of the signal corresponds to the actual signal component of CRS. In this case, the UE is capable of calculating Signal to Noise ratio by measuring the size of the interference at the tail part. Such an interference measurement is possible because different cells transmit no same CRS. Since the different cells transmit CRSs using different frequency-time resources and the cells apply unique scrambling codes, the above interference measurement is possible. In the case of LTE/LTE-A, the scrambling of the CRS is determined by Cell ID of the corresponding cell.

In the DAS-based LTE/LTE-A system, however, all antenna groups of the same cell transmit the CRS at the same timing and cannot apply unique scrambling CRSs. If the different antenna groups of the same cell cannot transmit unique CRSs, although the inter-cell interference amount from the antenna groups of the neighbor eNBs can be measured, it is impossible to measure the intra-cell interference from other antenna groups of the same cell.

In the case of measuring the interference amount using the method described with reference to FIG. 5, the UE is capable of calculating the interference caused by the antenna groups of other cells but not the interference caused by the other antenna groups of the same cell, resulting in inaccurate Signal-to-Interference ratio. The inaccurate Signal-to-Interference ratio causes significant performance degradation of the LTE/LTE-A system which determines downlink data rate using AMC based on the Signal-to-Interference ratio.

The present disclosure proposes an efficient interference measurement method and apparatus to solve this problem.

As described above, in order to determine the downlink data rate efficiently in the DAS-based communication system, the UE has to have the capability of measuring the intra-cell interference as well as the inter-cell interference. In order to accomplish this, the present disclosure proposes a method for measuring interference based on CSI-RS.

SUMMARY

The present disclosure provides an interference measurement method and apparatus for efficient communication in the DAS system.

In accordance with an aspect of the present disclosure, a method for transmitting channel state information based on interference measurement of a terminal in a Distributed Antenna System (DAS) is provided. The method includes receiving configuration of Interference Measurement Resource (IMR) for measuring interferences caused by plural Transmission Points (TPs), receiving control information including scheduling information on Physical Downlink Shared Channel (PDSCH), determining whether IMR-based interference measurement and PDSCH reception occur at a same subframe, and transmitting the channel state information generated according to a result of the determination.

In accordance with another aspect of the present disclosure, a method for a base station to assume a channel state information generation process in a Distributed Antenna System (DAS) is provided. The method includes configuring Interference Measurement Resource (IMR) for measuring interferences caused by plural Transmission Points (TPs), transmitting control information including scheduling information on Physical Downlink Shared Channel (PDSCH), determining whether IMR-based interference measurement and PDSCH reception occur at a same subframe, and assuming a channel state information generation process according to a result of the determination.

In accordance with another aspect of the present disclosure, an apparatus for transmitting channel state information based on interference measurement of a terminal in a Distributed Antenna System (DAS) is provided. The apparatus includes a controller which controls receiving configuration of Interference Measurement Resource (IMR) for measuring interferences caused by plural Transmission Points (TPs) and control information including scheduling information on Physical Downlink Shared Channel (PDSCH), determining whether IMR-based interference measurement and PDSCH reception occur at a same subframe, and transmitting the channel state information generated according to a result of the determination.

In accordance with another aspect of the present disclosure, an apparatus for a base station to assume a channel state information generation process of a base station in a Distributed Antenna System (DAS) is provided. The apparatus includes a controller which controls configuring Interference Measurement Resource (IMR) for measuring interferences caused by plural Transmission Points (TPs), transmitting control information including scheduling information on Physical Downlink Shared Channel (PDSCH), determining whether IMR-based interference measurement and PDSCH reception occur at a same subframe, and assuming a channel state information generation process according to a result of the determination.

In accordance with another aspect of the present disclosure, a method for a base station to support interference measurement of a terminal in a Distributed Antenna System (DAS) is provided. The method includes determining whether Physical Downlink Shared Channel (PDSCH) exists in a certain Resource Block (RB) and transmitting, when no PDSCH exists, an interference signal generated randomly from a neighbor base station to the terminal on an interference measurement resource.

In accordance with another aspect of the present disclosure, a base station supporting interference measurement of a terminal in a Distributed Antenna System (DAS) is provided. The base station includes a transceiver which transmits and receives data and a controller which determines whether Physical Downlink Shared Channel (PDSCH) exists in a certain Resource Block (RB) and controls, when no PDSCH exists, the transceiver to transmit an interference signal generated randomly from a neighbor base station to the terminal on an interference measurement resource.

In accordance with another aspect of the present disclosure, an interference measurement method of a terminal in a Distributed Antenna System (DAS) is provided. The method includes receiving configuration information on interference measurement resource, performing interference measurement on the interference measurement resource according to the configuration information, and transmitting interference measurement result, wherein the interference measurement resource includes, when no Physical Downlink Shared Channel (PDSCH) exists in a certain Resource Block (RB) of a neighbor base station, and interference signal predicted to be transmitted by the neighbor base station. In accordance with still another aspect of the present disclosure, a terminal for measuring interference in a Distributed Antenna System (DAS) is provided. The terminal includes a transceiver which transmits and receives data and a controller which controls the transceivers to receive configuration information on interference measurement resource, performs interference measurement on the interference measurement resource according to the configuration information, and transmit interference measurement result, wherein the interference measurement resource includes, when no Physical Downlink Shared Channel (PDSCH) exists in a certain Resource Block (RB) of a neighbor base station, and interference signal predicted to be transmitted by the neighbor base station.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION

Exemplary embodiments of the present disclosure are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure.

Although the description is directed to the OFDM-based radio communication system, particularly the 3GPP EUTRA, it will be understood by those skilled in the art that the present disclosure can be applied even to other communication systems having the similar technical background and channel format, with a slight modification, without departing from the spirit and scope of the present disclosure.

In the above-described distributed antenna system, the UE has to have the capability of measuring inter-cell interference as well as inter-cell interference for determining downlink data rate efficiently. In order to accomplish this, the present disclosure proposes an interference measurement method based on muting or zero-power CSI-RS.

The proposed interference method uses the muting technique. In this case, the eNB notifies the UE of the resource for use in interference measurement. That is, a part of the frequency-time resource of each antenna group is allocated as interference measurement resource at which transmission is muted only for UE's interference measurement.

Figure 6:
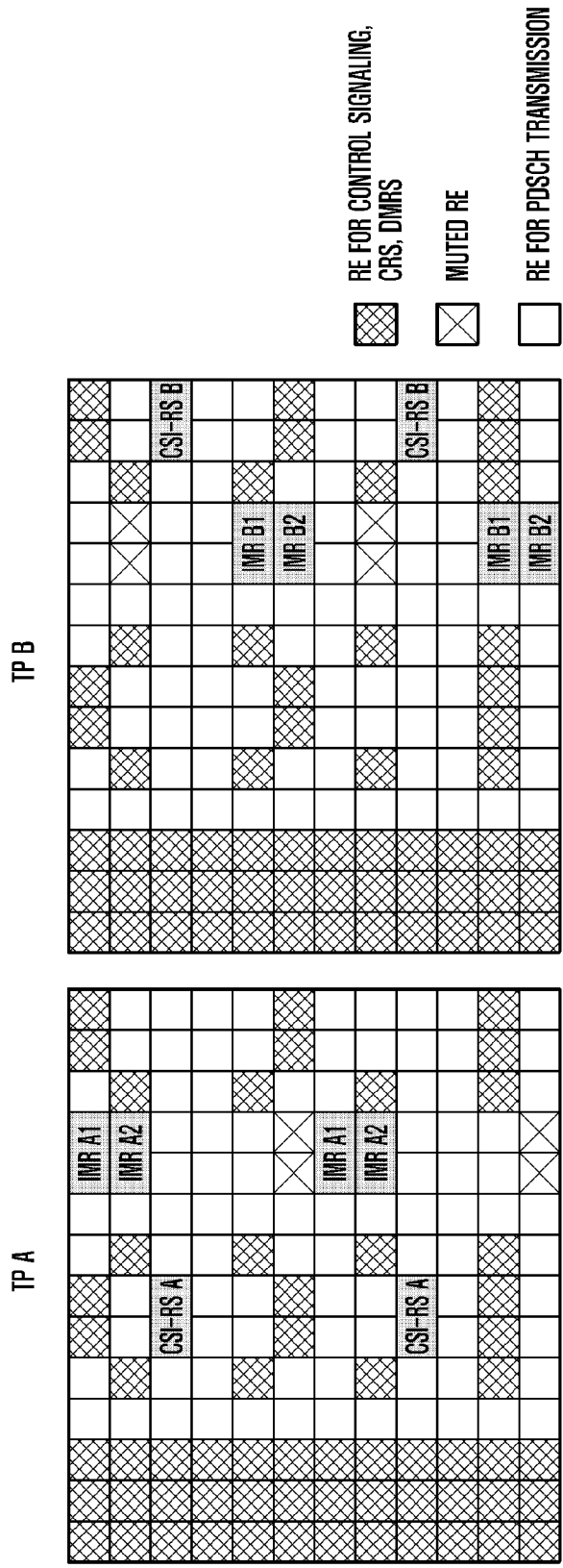
FIG. 6 is a diagram illustrating exemplary interference measurement resource patterns of RB for the interference measurement method according to an embodiment of the present disclosure.

FIG. 6 is a diagram illustrating exemplary interference measurement resource patterns of RB for the interference measurement method according to an embodiment of the present disclosure.

Figure 1:
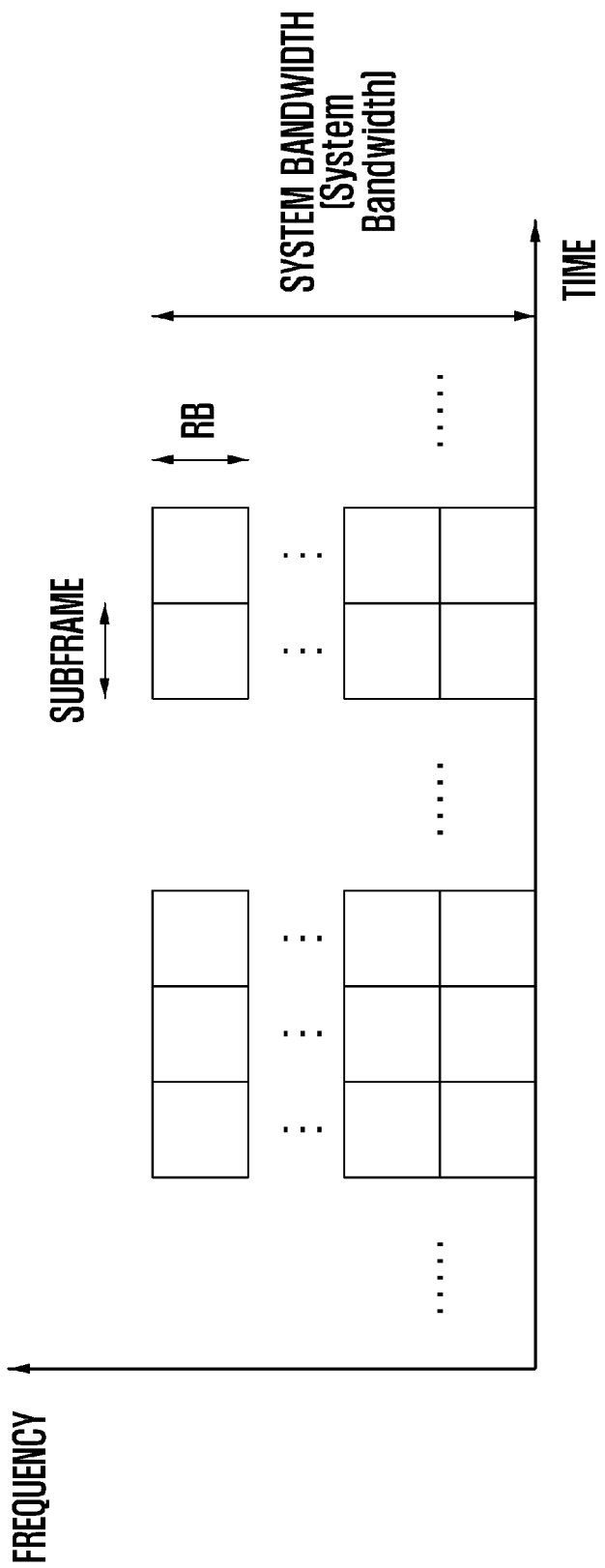
FIG. 1 is a graph illustrating a relationship between time and frequency resources in LTE/LTE-A system.
Figure 2:
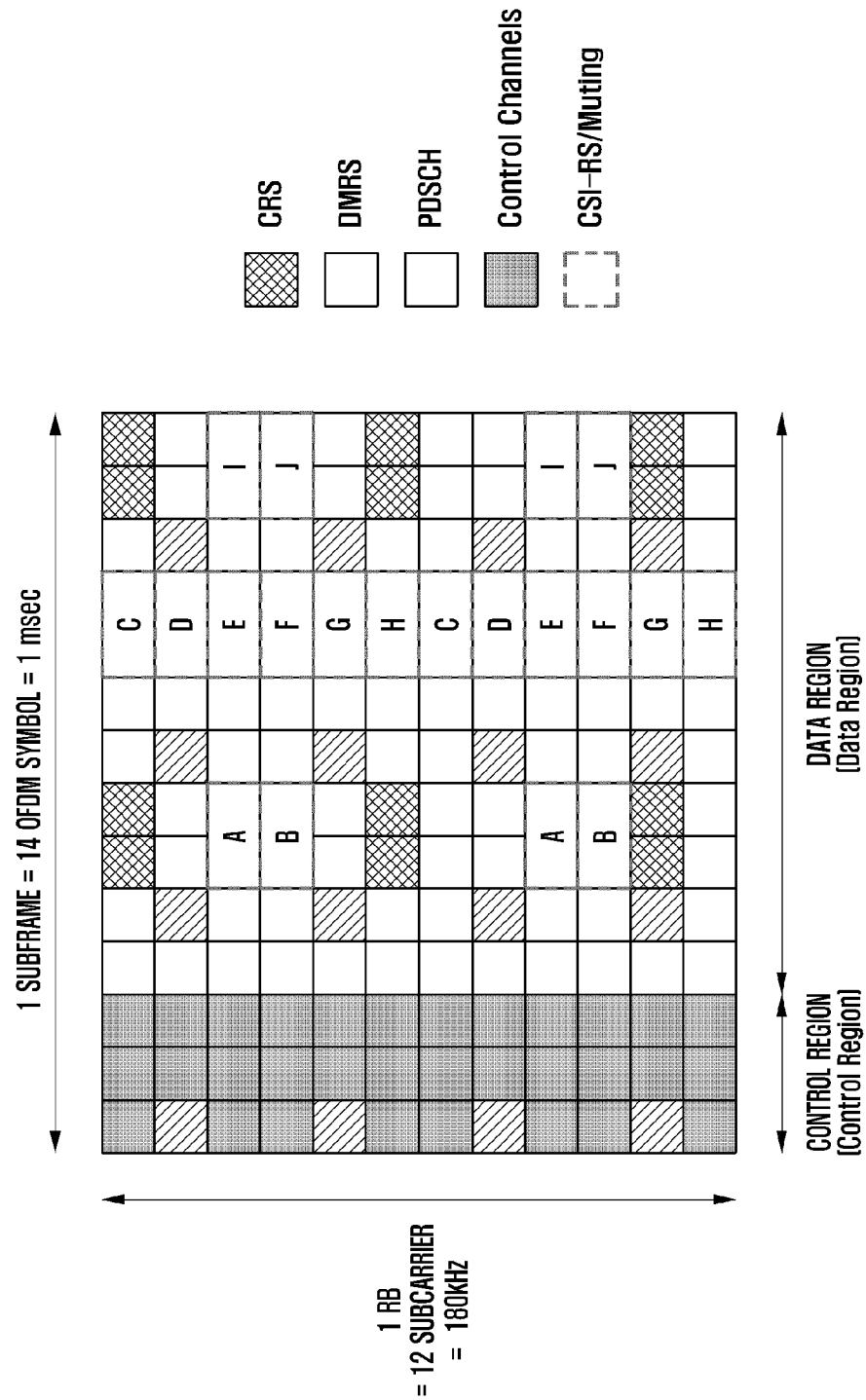
FIG. 2 is a time-frequency grid illustrating a single resource block of a downlink subframe as a smallest scheduling unit in the LTE/LTE-A system
Figure 3:
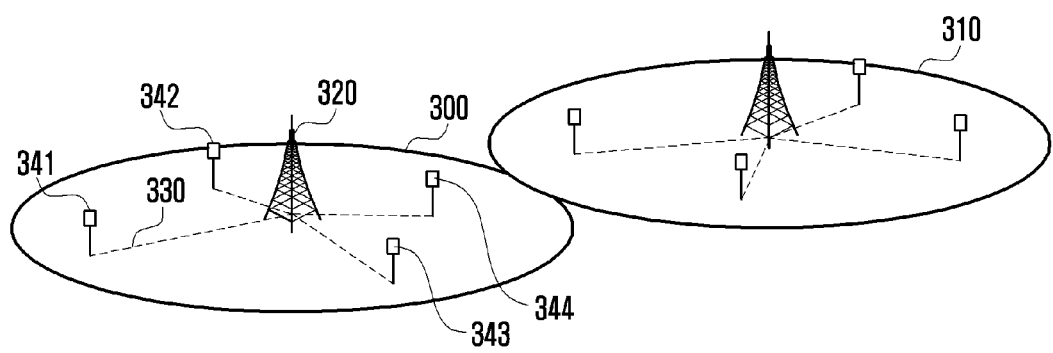
FIG. 3 is a diagram illustrating an exemplary antenna arrangement in the conventional distributed antenna system.
Figure 4:
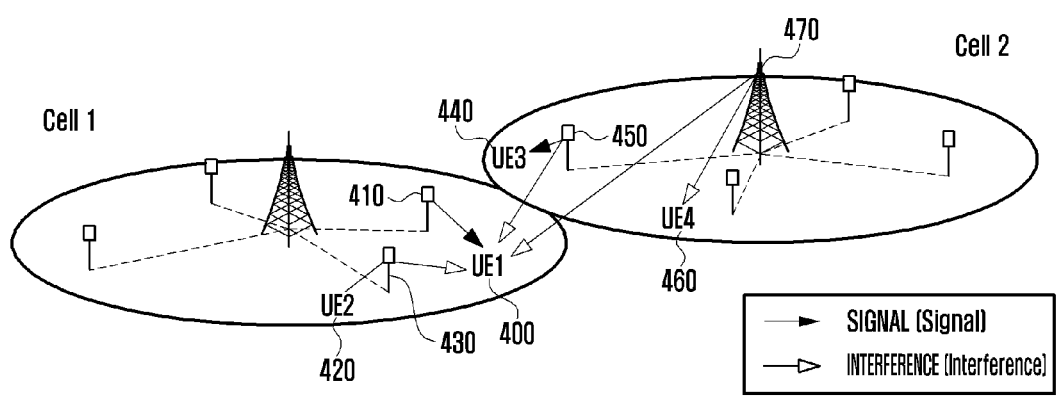
FIG. 4 is a diagram illustrating an exemplary situation of interference between antenna groups transmitting different UEs in the conventional distributed antenna system.
Figure 5:
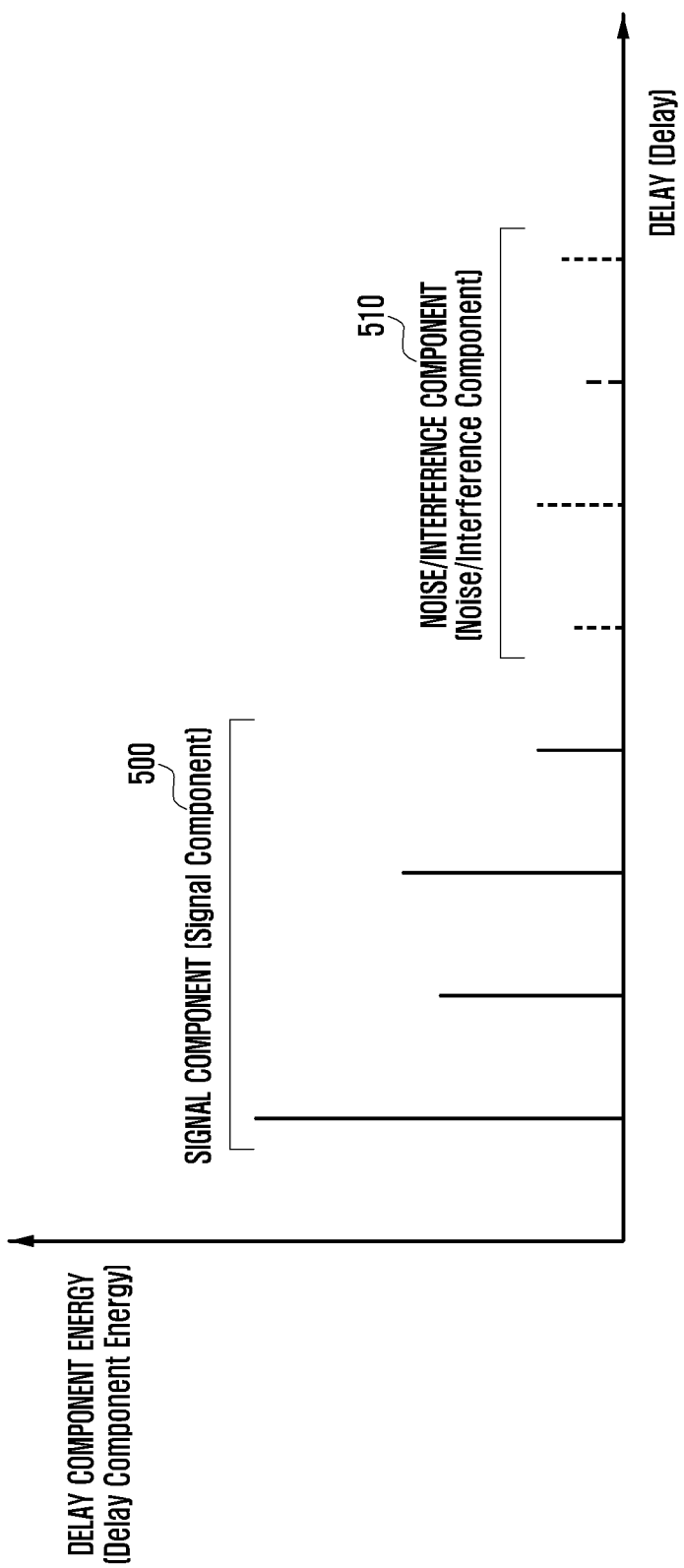
FIG. 5 is a graph illustrating delay domain signals converted from CRS.

The eNB configures one non-zero power CSI-RS and two Interference Measurement Resources (IMRs) for two Transmission Points (TP A and TP B) for use in UE's channel state information generation. Each of the two IMRs corresponds to one of the zero-power CSI-RSs described with reference to FIG. 2. That is, the eNB configures CSI-RS A, IMR A1, and IMR A2 to the UE as shown in FIG. 6 in order for the UE to measure the channel state information for TP A. The UE measures the channel from the TP A to the UE based on the CSI-RS A and predicts the interference from the other TPs when the TP A transmits PDSCH based on IMR A1 and IMR A2.

The radio resource configured as IMR A1 is identical with the radio resource configured for PDSCH at TP B. The interference measured at the IMR A may include the interference caused by the PDSCH transmitted by TP B. The interference measured at IMR A1 may be used for generating the channel state information in consideration of the interference from TP B when the UE receives PDSCH from TP A.

The radio resource configured as IMR A2 is identical with the radio resource at which radio signal transmission is muted or which is configured for zero-power CSI-RS at the TP B. Accordingly, since although TB B transmits PDSCH when the UE measures interference on IMR A2 the PDSCH is muted at IMR A2, the UE may measure the interference with the exclusion of the interference caused by TP B. The interference measured at IMR A2 may be used for generating the channel state information when the UE receives PDSCH from TP A with no interference from TP B.

The UE may generate the channel state informations for the cases with and without interference from TP B. These channel state informations are reported to the eNB such that the eNB may determine whether to transmit PDSCH addressed to other UE through TP B in transmitting PDSCH addressed to the UE through TP A based on the channel state informations with and without consideration of the interference from TP B. In the case of transmitting PDSCH to a UE through TP A while transmitting PDSCH to another UE through TP B, although it is advantageous to perform transmission through two TPs, the PDSCH transmissions from TP A and TP B may interfere to each other. The reason for transmitting, at the UE, channel state informations for the cases with and without consideration of the interference from TP B is to check the advantages and disadvantages in system performance according to the presence/absence of transmission through TP B.

The CSI-RS B and IMR B1 and IMR B2 of FIG. 6 are used in the same way. The eNB configures plural IMR for one TP in order for the UE to generate channel state informations in consideration of various interference situations.

As described above, IMR is the radio resource configured by the eNB for use in UE's interference measurement, and the UE determines the channel state information under the assumption that all the signals received on the corresponding radio resource are interference. That is, in case of measuring interference on IMR A1, the UE determines all the signals received at the REs belonging to IMR A1 as interference.

In the interference measurement method, one IMR is configured per CSI-RS for the UE. At this time, the UE measures the radio channel between the eNB and the UE bases on the CSI-RS and interference based on the IMR. In the case that the eNB configures the CSI-RS and IMR for the UE as shown in FIG. 6, the UE receives the control information including the configuration as shown in table 1 from the eNB through higher layer signaling.

TABLE 1

Channel State information measurement-related configuration

| Index | Radio channel measurement between TP and UE | Interference measurement |
|---|---|---|
| 0 | CSI-RS A | IMR A1 |
| 1 | CSI-RS A | IMR A2 |
| 2 | CSI-RS B | IMR B1 |
| 3 | CSI-RS B | IMR B2 |

As shown in table 1, the UE is configured to report total four channel state informations to the eNB. Each channel state information configuration indicates one CSI-RS and one IMR. The UE measures CSI-RSs and IMRs to check the radio channel from the eNB to the UE and interference.

As described above, in the case of using IMR as proposed by the present disclosure, it is possible to configure IMR to the UE appropriately in the network operating in the cooperative transmission mode such that the UE is capable of reporting channels state information for various cooperative transmission modes. The reason for configuring plural IMRs per TP or CSI-RS is to acquire the channel state informations in various interference situations with or without the interference caused by PDSCH transmission through another TP.

In order to secure the usability of the channel state information for various interference situations, it is essential to measure the interferences accurately. In the case of generating the channel state information in consideration of the interference from a specific TP, it is necessary to perform interference measurement for the case where the corresponding TP transmits PDSCH on all frequency bands at the IMR. In the case of generating the channel state information with the cancellation of the interference from a specific TP, it is necessary to perform interference measurement for the case where the corresponding TP mutes PDSCH transmission on all frequency bands at the IMR.

In order for the UE to measure the interference from a specific TP for the above described IMR-based interference measurement, it is assumed that the corresponding TP transmits PDSCH. That is, in order for the UE to measure the interference caused by the TP B, the TP B has to transmit PDSCH. If the TP B transmits no PDSCH on a specific frequency band, the UE cannot measure interference accurately on the corresponding frequency band carrying no PDSCH and thus reports inaccurate channel state information to the eNB.

Figure 7:
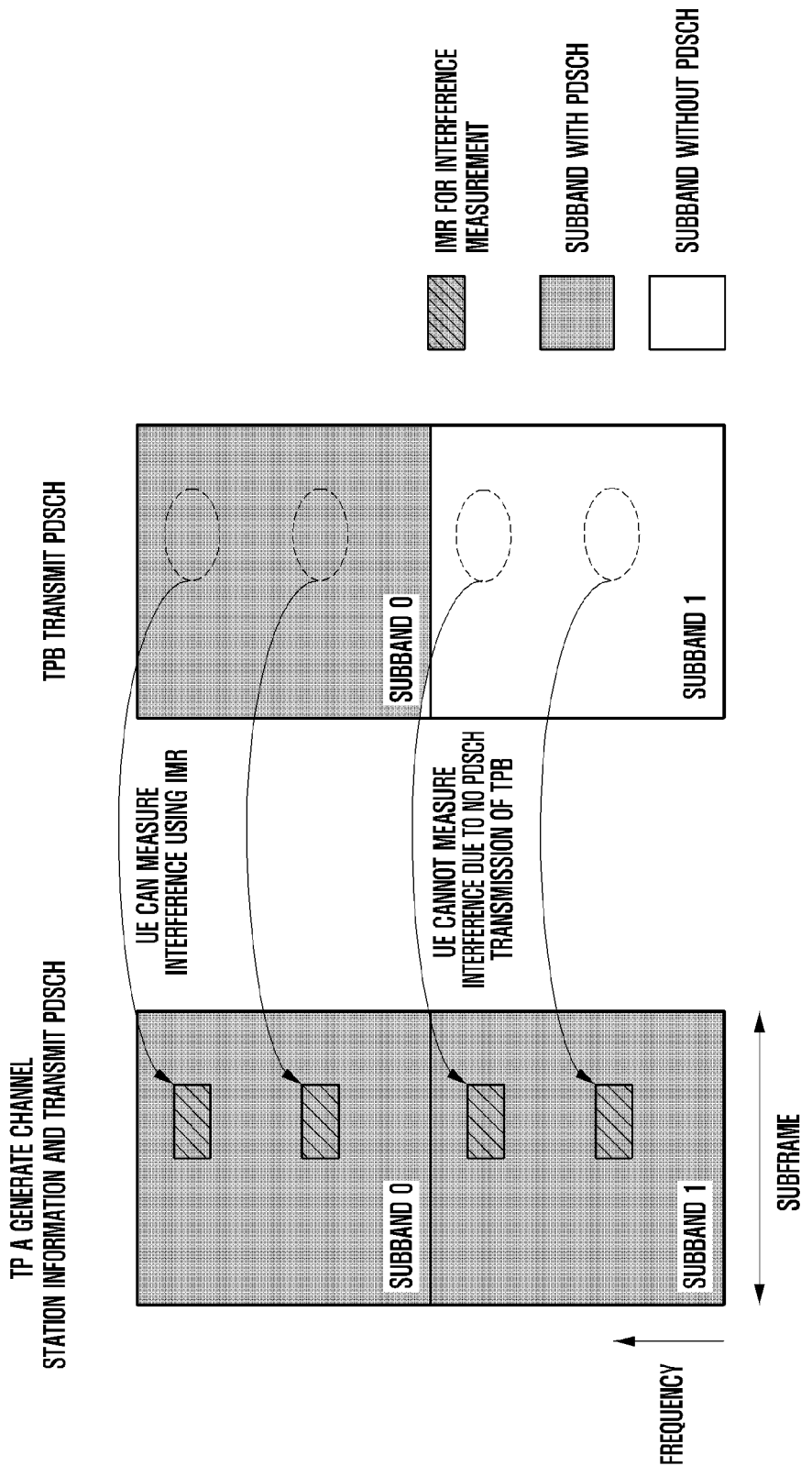
FIG. 7 is a diagram illustrating interference measurements on the frequency bands with and without PDSCH transmission in the interference measurement method according to an embodiment of the present disclosure.

FIG. 7 is a diagram illustrating interference measurements on the frequency bands with and without PDSCH transmission in the interference measurement method according to an embodiment of the present disclosure.

In FIG. 7, the UE measures the interference caused by TP B and generates the channel state information based on the measured interference. In the case of FIG. 7, the UE measures interference on the two frequency bands, i.e. subband 0 and subband 1. Here, the TP B transmits PDSCH on the subband 0 but not on the subband 1. Here, the term 'subband' denotes the frequency band for transmitting PDSCH from the eNB to the UE and, typically, one subband consists of one or more RBs in LTE/LTE-A. Accordingly, the UE cannot measure interference caused by TP B on subband 1 and thus reports inaccurate channel state information to the eNB. Although the channel state information is received, the eNB cannot acquire accurate information on the influence of the interference caused by the TP B, resulting in degradation of cooperative transmission.

In order to overcome this problem, an embodiment of the present disclosure may use an emulated interference signal corresponding to PDSCH. The emulated interference signals is the signal transmitted by the eNB in order for the UE to measure interference although no PDSCH is transmitted on the corresponding frequency band.

Figure 8:
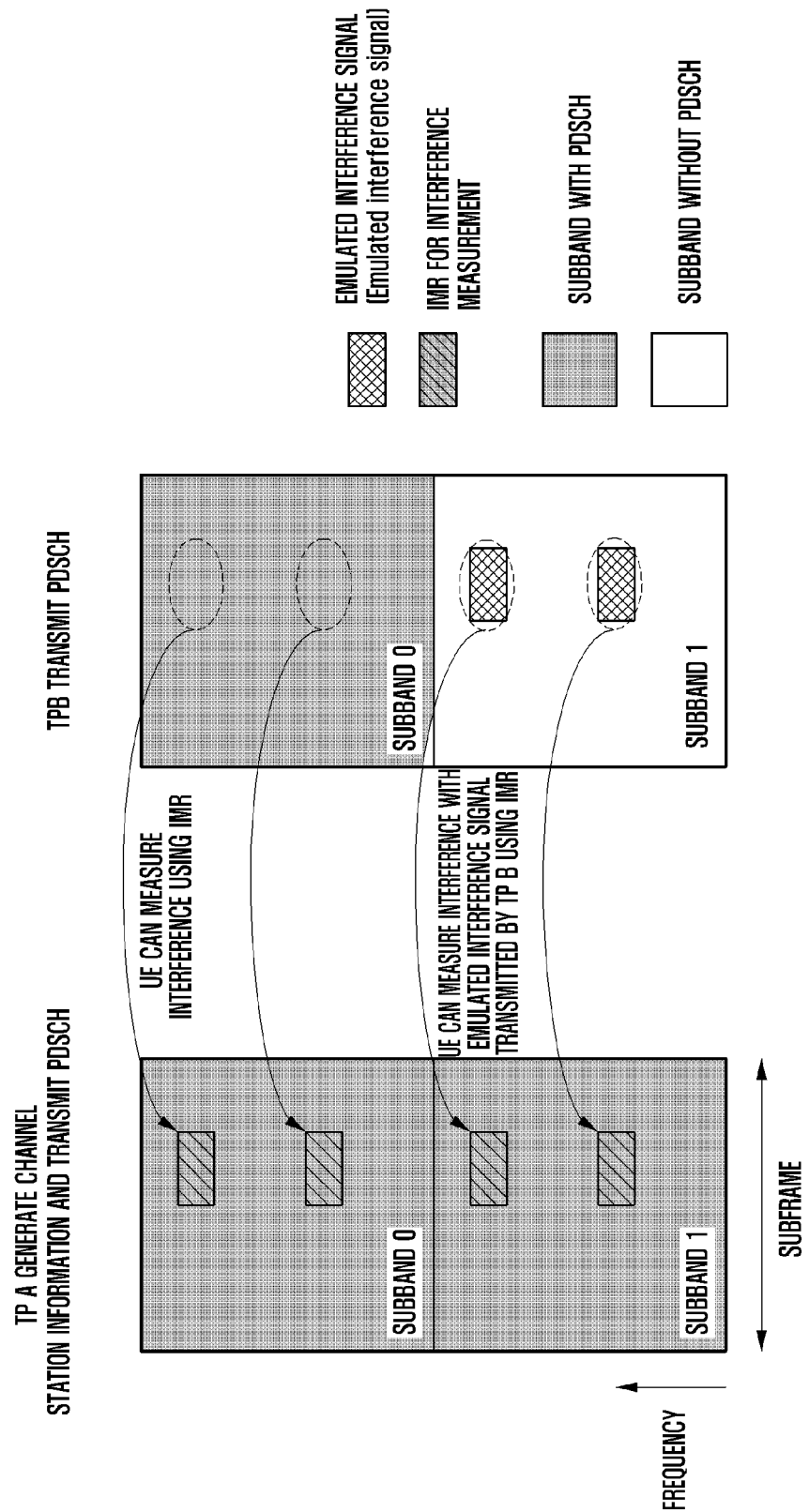
FIG. 8 is a diagram illustrating interference measurements with the emulated interference signal sin the interference measurement method according to an embodiment of the present disclosure.

FIG. 8 is a diagram illustrating interference measurements with the emulated interference signal sin the interference measurement method according to an embodiment of the present disclosure.

In FIG. 8, the UE measures the interference caused by TP B and generates the channel state information reflecting the measurement result. In the case of FIG. 8, the UE measures the interference on the two frequency bands, i.e. subband 0 and subband 2. Like the embodiment of FIG. 7, the TP B transmits PDSCH on the subband 0 but not on the subband 1. At this time, the TP b transmits the emulated interference signal on the subband 1 carrying no PDSCH. In the case that the emulated interference signal is transmitted, the UE measure the emulated interference signal to check the interference caused by the TP B and generates accurate channel state information to the eNB based on measurement result.

The emulated interference signal is transmitted in consideration of IMR configurations of other TPs. That is, in the case the TP A is allocated a specific IMR to measure the interference caused by the TP B, the TP B transmits the emulated interference signal on the same time-frequency resource as the corresponding IMR. The TP B transmits the emulated interference signal only when the PDSCH is transmitted. This is because when PDSCH is transmitted the UE is capable of measuring PDSCH to check the interference. In order to accomplish this, there is a need of exchanging control information on the IMRs configured for the respective TPs and scheduling information on PDSCH transmission.

Another problem that may occurs in IMR-based interference measurement is that the channel state information generated by the UE, when the PDSCH is received at the same time as the interference measurement on IMR, does not reflect the real radio channel condition correctly. Such a situation is depicted in FIG. 9.

Figure 9:
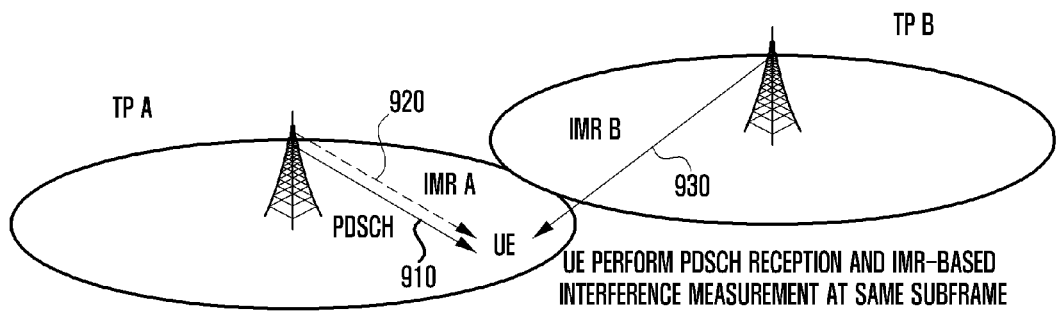
FIG. 9 is a diagram illustrating an exemplary situation in which IMR-based interference measurement and PDSCH reception are performed in the same subframe.

FIG. 9 is a diagram illustrating an exemplary situation in which IMR-based interference measurement and PDSCH reception are performed in the same subframe.

In FIG. 9, the UE receives PDSCH 910 transmitted through TP A. At the subframe carrying PDSCH 910, the UE also performs interference measurement for generating channel state information for TP A and TP B. That is, the UE receives PDSCH 910 from the TP A and performs interference measurement based on IMR B 930 to generate channel state information for TP B simultaneously. In this case, it may occur that the UE measures interference at the RE configured for IMR B 930 while receiving PDSCH 910 thereon. In this case, the UE generates the channel state information, regarding the PDSCH as interference.

A description is made thereon with reference to FIG. 6.

The UE receives the PDSCH transmitted from the TP A. In FIG. 6, the white REs without pattern in the RB are REs for use in PDSCH transmission. The UE measures interference at the same subframe. At this time, the interference measurement is performed to generate channel state information for the TP B. In FIG. 6, the REs marked with IMR B1 and IMR B2 of the RB for the TP B are the REs used for interference measurement. It is shown that the IMR B1 of the two IMR is overlapped with the REs for PDSCH transmission of the TP A. This means that the UE receives PDSCH transmitted by the TP A and measures interference to the TP B simultaneously. In this case, the UE uses the PDSCH REs for interference measurement. That is, the UE regards the data signal addressed to itself as interference to be used for generating channel state information for another TP.

Typically, the signal addressed to a specific terminal is transmitted in the state of being beamformed optimally by taking notice of the UE's radio channel. That is, the eNB performs beamforming in the direction optimized to the radio channel of the UE using a plurality of antennas so as to maximize the reception energy to the UE. If the data signal beamformed to the UE is measured as interference, it may appear significant interference as compared to reasonable interference. Here, the reasonable interference means the interference measured in the state without application of beamforming. Typically, the interference influencing the UE is the interference occurring without signal optimization such as beamforming. In the case that excessively large interference is measured, the channel state information generated by the UE may be distorted without correct radio channel environment, resulting in system performance degradation.

Figure 10:
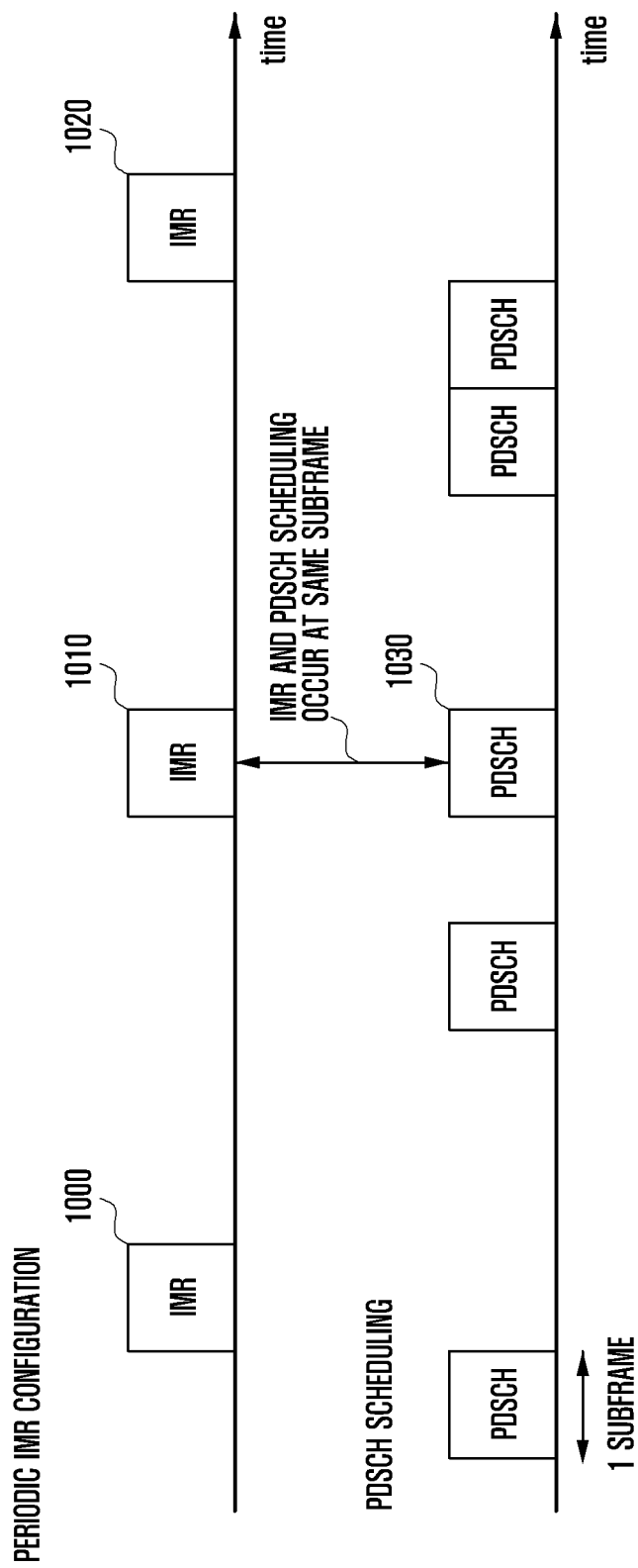
FIG. 10 is a diagram illustrating an exemplary situation where the IMR-based interference measurement and PDSCH reception are performed at the same subframe.

FIG. 10 is a diagram illustrating an exemplary situation where the IMR-based interference measurement and PDSCH reception are performed at the same subframe.

Referring to FIG. 10, the IMR occurs at a certain subframe at a predetermined interval as denoted by reference numbers 1000, 1010, and 1020. Meanwhile, the PDSCH transmission occurs irregularly according to the scheduling decision of the eNB as denoted by reference number 1030.

If the periodic IMR and non-periodic PDCCH occur at the same subframe, this causes problem in generating accurate channel state information. This is the case where the IMR 1010 and PDSCH 1030 occur at the same frame as shown in FIG. 10. If the PDSCH transmitted by a certain TP is regarded as interference for use in generating the channel state information of another TP, this may cause significant problem. Such a problematic situation may occur when the following two conditions are fulfilled.

Condition 1: UE A receives PDSCH transmitted by eNB at subframe i

UE A is capable of checking receipt of PDSCH based on scheduling message carried in PDCCH or E-PDCCH Condition 2: UE A measures interference using IMR at subframe i, and some of REs corresponding to IMR used for PDSCH transmission of condition 1

In the case that the UE receives PDSCH and measure interference using IMR simultaneously as shown in FIG. 10, the present disclosure proposes three embodiments.

Embodiment 1

If the conditions 1 and 2 are fulfilled, the UE skips interference measurement at the corresponding subframe. That is, if the IMR-based interference measurement and PDSCH reception occur at the same subframe, the UE generates the channel state information based on the previously measured interference without interference measurement at the corresponding subframe. At this time, the most recently measured interference may be used.

Embodiment 2

If the conditions 1 and 2 are fulfilled, the UE skips interference measurement in the RBs carrying PDSCH addressed to itself in the corresponding subframe but measures interference in the RBs carrying no PDSCH to generate the channel state information. Such an example is shown in FIG. 11.

Figure 11:
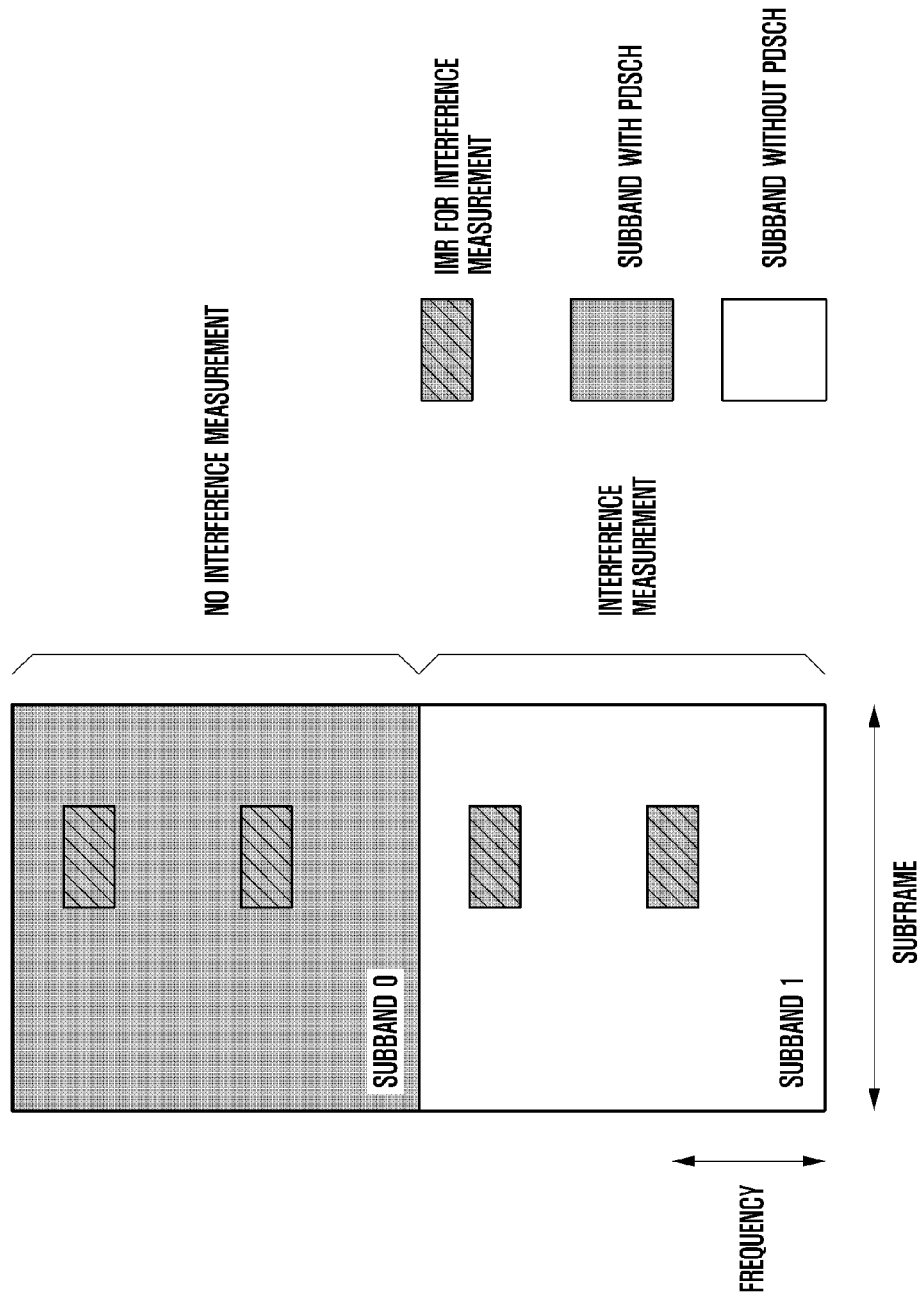
FIG. 11 is a diagram illustrating a principle of interference measurement method according to an embodiment of the present disclosure.

FIG. 11 is a diagram illustrating a principle of interference measurement method according to an embodiment of the present disclosure. In the embodiment, the interference measurement is skipped in the RB carrying PDSCH and performed in the RBs carrying no PDSCH.

Referring to FIG. 11, the UE receives PDSCH on the subband 0 but not on subband 1. Accordingly, the UE skips interference measurement on the subband 0 but performs interference measurement on the subband 1. At this time, the channel state information on the subband 0 is generated using the interference measured at the previous subframe on the subband 0 or the interference measured at the current subframe on the subframe 1. In order to generate the channel state information for subband 0 using the interference measured on the subband 1, it is necessary to analogize the interference to the subband 0 using the interference measured on the subband 1. In this case, it is possible to generate the channel state information under the assumption that the interference on the subband 0 is identical with the interference on the subband 1 in property.

Embodiment 3

If the conditions 1 and 2 are fulfilled, the UE may process the interference measured in the RB carrying PDSCH addressed to the UE and the interference measured in the RB carrying no PDSCH at the corresponding subframe separately. As described above, if the UE measures the PDSCH as interference, excessive interference may be measured. By taking notice of this, the UE may compensate the interference measured in the RB carrying PDSCH to drop down at a predetermined rate. That is, the UE applies a constant Interference Adjustment Factor (IAF) to the interference measured in the RB carrying PDSCH. The IAF is multiplied to the interference measured in the RB carrying PDSCH to adjust the interference. The IAF may be notified to the UE through higher layer signaling or determined according to other control information configured at the UE. One approach for the UE to determine IAF according to other control information is to differentiate the value of IAF depending on the rank of PDSCH addressed to the UE. Another approach for the UE to determine IAF according to other control information is to determine IAF depending on the number of CSI-RS ports of the eNB. It is also possible to determine IAF by taking both the number of CSI-RS ports and rank of PDSCH into account.

Figure 12:
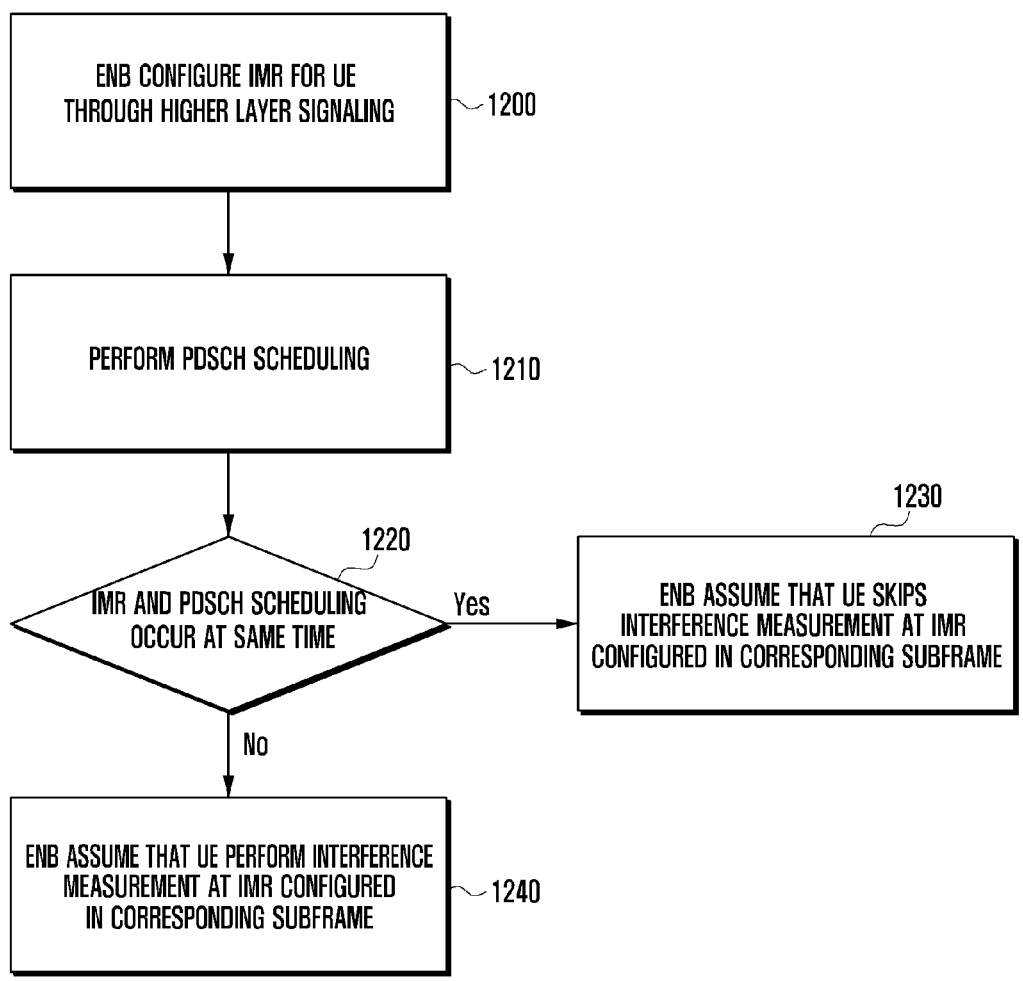
FIG. 12 is a flowchart illustrating an eNB procedure for interference measurement according to an embodiment of the present disclosure.

FIG. 12 is a flowchart illustrating an eNB procedure for interference measurement according to an embodiment of the present disclosure.

FIG. 12 is a flowchart illustrating the procedure when embodiment 1 is applied, and the same procedure may be applied to other methods. In FIG. 12, the eNB configure IMR for the UE through higher layer signaling at operation 1200. Next, the eNB performs PDSCH scheduling at operation 1210. The PDSCH scheduling is to determine, when plural UE exists within one cell, the UE to which PDSCH transmission is performed. The eNB determines whether the UE fulfills the conditions 1 and 2 based on the PDSCH scheduling decision of operation 1210 and the IMR configuration of operation 1200 so as to perform the IMR-based interference measurement and PDSCH reception at the same subframe at operation 1220.

If it is determined that the UE has to perform the IMR-based interference measurement and PDSCH reception at the same time at operation 1220, the eNB generates the channel state information using the previously measured interference without performing interference measurement at the corresponding subframe at operation 1230. Otherwise if it is determined that the UE does not perform the IMR-based interference measurement and PDSCH reception at the same time at operation 1220, the eNB assumes that when the IMR exists in the corresponding subframe the UE generates the channel state information by performing IMR-based interference measurement at the corresponding subframe at operation 1240.

Figure 13:
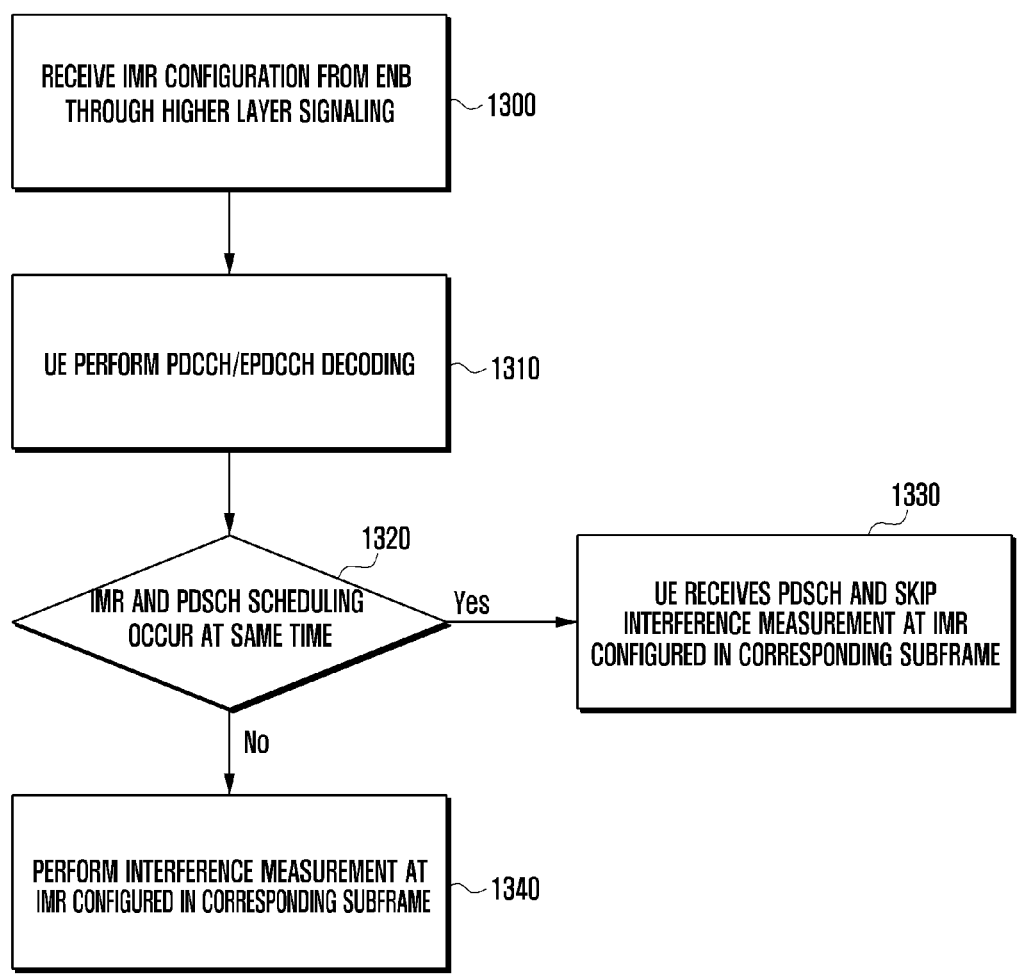
FIG. 13 is a flowchart illustrating a UE procedure for interference measurement according to an embodiment of the present disclosure.

FIG. 13 is a flowchart illustrating a UE procedure for interference measurement according to an embodiment of the present disclosure.

FIG. 13 is a flowchart illustrating the procedure when embodiment 1 is applied, and the same procedure may be applied to other methods. In FIG. 13, the UE receives IMR-related control signal from the eNB through higher layer signaling at operation 1300. The control information includes information on the IMR to be used for interference measurement. Next, the UE performs decoding on PDCCH or E-PDCCH at operation 1310. The UE receives the PDSCH scheduling information from the eNB through control channel such as PDCCH and E-PDCCH. That is, the eNB notifies the UE of the PDSCH transmission using PDCCH or E-PDCCH. For this purpose, the UE performs decoding on PDCCH or E-PDCCH at step 1310.

According to the IMR configuration acquired at operation 1300 and the PDSCH scheduling information acquired at the PDCCH/E-PDCCH decoding operation at 1310, the UE determines whether the IMR-based interference measurement and PDCCH reception are performed at the same subframe at operation 1320. That is, the UE determines whether the first and second conditions are fulfilled. If it is determined that the IMR-based interference measurement and PDSCH reception are performed at the same subframe, the UE generates the channel state information based on the previously measured interference without performing IMR-based interference measurement at the corresponding subframe at operation 1330. Otherwise if it is determined that the IMR-based interference measurement and PDSCH reception are not performed at the same subframe at operation 1320, the UE performs, when the corresponding subframe includes IMR, the IMR-based interference measurement at operation 1340.

Figure 14:
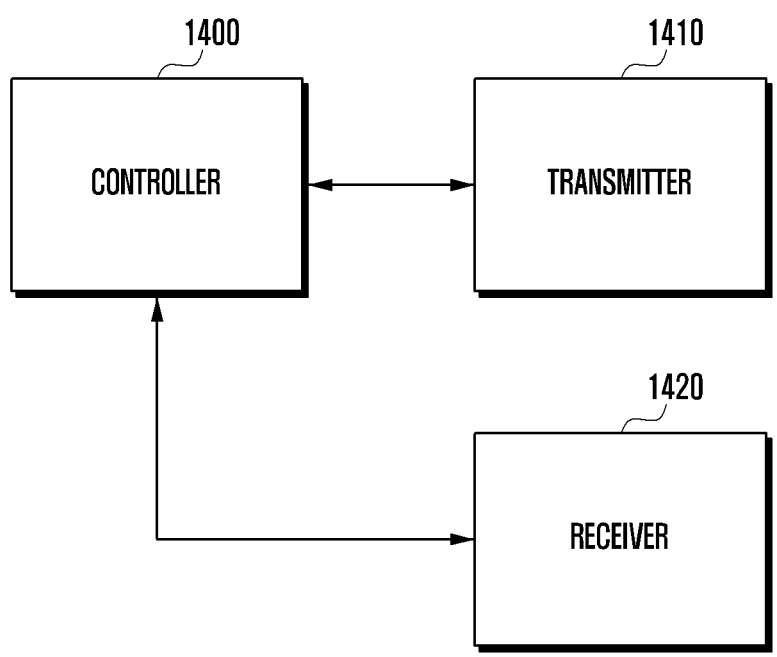
FIG. 14 is a block diagram illustrating a configuration of the eNB according to an embodiment of the present disclosure.

FIG. 14 is a block diagram illustrating a configuration of the eNB according to an embodiment of the present disclosure.

In FIG. 14, the controller 1400 may determine UE's IMR configuration and PDSCH scheduling. The UE's IMR configuration determined by the eNB is notified to the eNB by means of the transmitter 1410. According to the PDSCH scheduling decision of the eNB, PDCCH/ePDCCH and PDSCH are transmitted to the UE by means of the transmitter 1410. The eNB receives PDSCH and the channel state information according to the UE's IMR configuration by means of the receiver 1420. Here, the controller 1400 controls overall operations of the eNB. The controller 1400 also may control all of the above described operations of eNB.

Figure 15:
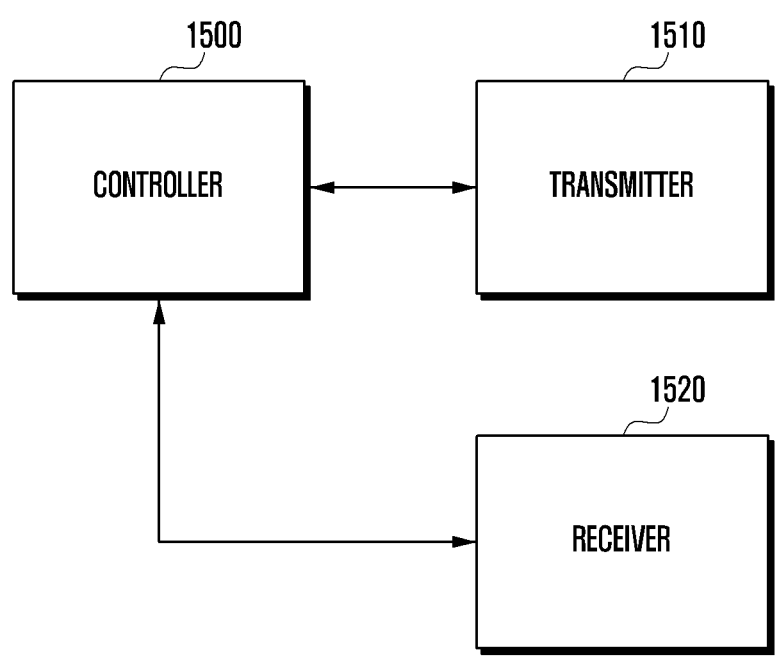
FIG. 15 is a block diagram illustrating a configuration of the UE according to an embodiment of the present disclosure.

FIG. 15 is a block diagram illustrating a configuration of the UE according to an embodiment of the present disclosure.

In FIG. 15, the controller 1500 receives control information on the IMR configuration from the eNB by means of the receiver 1520 to check the radio resource for use in interference measurement. The receiver 1520 performs decoding on PDCCH/ePDCCH for the controller 1500 to check the scheduled PDSCH. The controller 1500 determines whether to generate the channel state information by performing IMR-based interference measurement or based on the previously measured interference according to the IMR configuration and PDSCH scheduling. The channel state information is transmitted to the eNB by means of the transmitter 1510. Here, the controller 1500 may control overall operations of the UE. The controller 1500 also may control the above described operations of the UE.

The interference measurement method and apparatus of the present disclosure is capable of measuring interference for efficient communication in the distributed antenna system.

The specification and drawings are to be regarded in an illustrative rather than a restrictive sense in order to help understand the present disclosure. It is obvious to those skilled in the art that various modifications and changes can be made thereto without departing from the broader spirit and scope of the disclosure.

What is claimed is:

1. A method for a transceiver to support interference measurement of a terminal in a wireless network system, the method comprising:
   identifying configuration information on an interference measurement resource (IMR) for another transceiver;
   if a physical downlink shared channel (PDSCH) for the transceiver does not exist in a resource corresponding to the IMR for the another transceiver, generating an interference signal; and
   transmitting, by the transceiver, the interference signal in the resource to the terminal.

2. The method of claim 1, wherein an interference measurement is performed by the terminal based on the IMR.

3. The method of claim 2, wherein channel status information is transmitted from the terminal based on the interference measurement.

4. A transceiver supporting interference measurement of a terminal in a wireless network system, the transceiver comprises:
   a transmitter configured to transmit a signal; and
   a controller configured to:
   identify configuration information on an interference measurement resource (IMR) for another transceiver,
   if a physical downlink shared channel (PDSCH) for the transceiver does not exist in a resource corresponding to the IMR for the another transceiver, generate an interference signal, and
   control the transmitter to transmit the interference signal in the resource to the terminal.

5. The base station of claim 4, wherein an interference measurement is performed by the terminal based on the MIR.

6. The base station of claim 5, wherein channel status information is transmitted from the terminal based on the interference measurement.

7. An interference measurement method of a terminal in a wireless network system, the method comprising:
  receiving, from a first transceiver, configuration information on an interference measurement resource (IMR);
  receiving, from a second transceiver, a signal;
  performing an interference measurement based on the IMR; and
  transmitting channel status information based on the interference measurement,
  wherein if a physical downlink shared channel (PDSCH) for the second transceiver does not exist in a resource corresponding to the IMR for the first transceiver, an interference signal is generated and the interference signal is transmitted in the resource from the second transceiver to the terminal.

8. The method of claim 7, further comprising:
  receiving the first transceiver configuration information on a channel status information reference signal (CSI-RS); and
  performing a channel status measurement based on the CSI-RS,
  wherein the channel status information is transmitted based on the interference measurement and the channel status measurement.

9. A terminal for measuring interference in a wireless network system, the terminal comprising:
  a transceiver configured to transmit and receive signals; and
  a controller configured to:
    control the transceiver to receive, from a first transceiver, configuration information on an interference measurement resource (IMR),
    control the transceiver to receive a signal from a second transceiver,
    perform an interference measurement based on the IMR, and
    control the transceiver to transmit channel status information based on the interference measurement,
  wherein if a physical downlink shared channel (PDSCH) for the second transceiver does not exist in a resource corresponding to the IMR for the first transceiver, an interference signal is generated and the interference signal is transmitted in the resource from the second transceiver to the terminal.

10. The terminal of claim 9, wherein:
  the controller is further configured to control the transceiver to receive the first transceiver configuration information on a channel status information reference signal (CSI-RS), and perform a channel status measurement based on the CSI-RS, and
  the channel status information is transmitted based on the interference measurement and the channel status measurement.

* * * * *

UNITED STATES PATENT AND TRADEMARK OFFICE
CERTIFICATE OF CORRECTION

PATENT NO.      : 9,510,225 B2
APPLICATION NO. : 14/036644
DATED           : November 29, 2016
INVENTOR(S)     : Younsun Kim et al.

It is certified that error appears in the above-identified patent and that said Letters Patent is hereby corrected as shown below:

Claim 5, Line 3, "MIR." should be -- IMR. --

Signed and Sealed this
Fifth Day of June, 2018

Andrei Iancu
*Director of the United States Patent and Trademark Office*